June 4, 1968 R. W. JARVI 3,386,157
METHOD OF FABRICATING U-BOLT KEEPER ASSEMBLY
Filed June 10, 1963
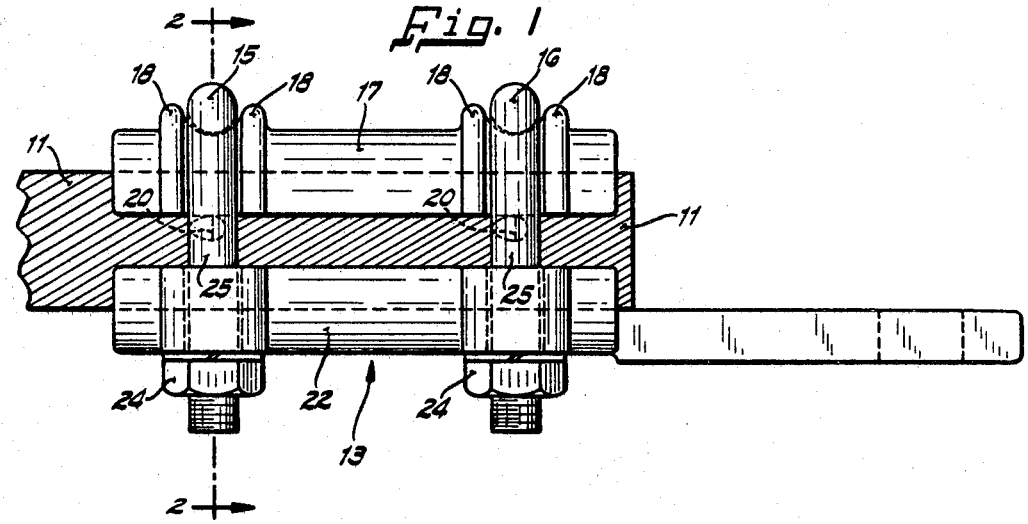
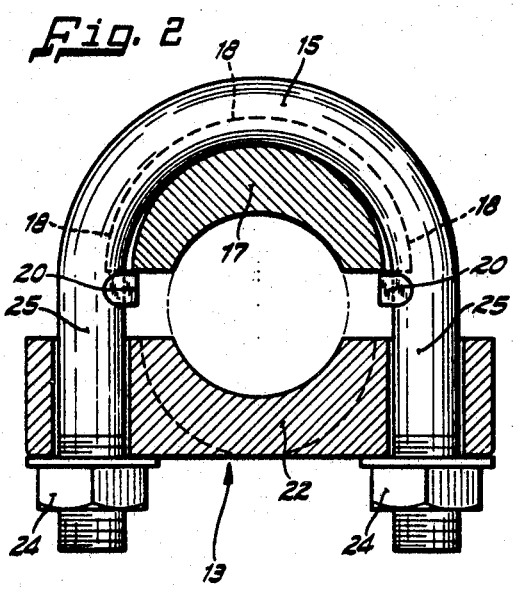
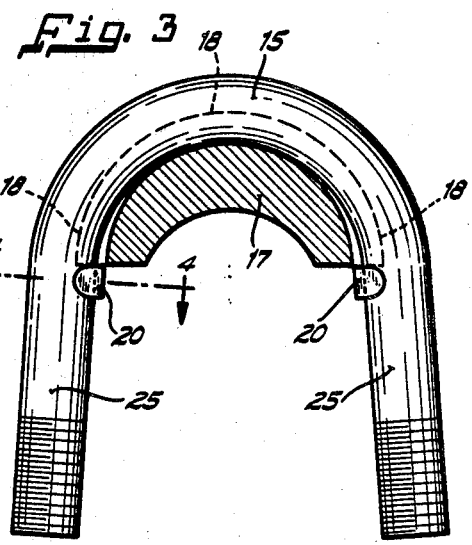
INVENTOR.
Robert W. Jarvi
BY
Attorney 3,386,157
METHOD OF FABRICATING U-BOLT
KEEPER ASSEMBLY
Robert W. Jarvi, Scarboro, Ontario, Canada, assignor to McGraw-Edison Company, Milwaukee, Wis., a corporation of Delaware
Filed June 10, 1963, Ser. No. 286,730
3 Claims. (Cl. 29—458)

This invention relates to hardware such as suspension clamps, strain clamps or connectors and, more particularly, to an apparatus and method whereby U-bolts are made captive on hardware.

The common method of fabricating parts that have a keeper and require, or wherein it is desirable to have one or more U-bolts as a captive portion of the assembly, is to form a keeper with a built-up portion at least slightly above the center line of the U-bolt in the assembled condition, and swage this portion about the U-bolt to prevent subsequent disassembly. Such deformation often causes failure of the part. With respect to parts that utilize ferrous keepers, the deformation, occasioned by the forming operation, impairs the galvanizing and necessitates redipping or painting with a liquid zinc compound. Either of these remedial operations entails additional expense and even so leaves a poor finish or patched-up appearance.

In the present invention a keeper with an associated captive U-bolt is provided wherein the U-bolt is initially only partially formed to a condition wherein the legs are substantially parallel but oriented in a slightly diverging relation. Projections are raised on the confronting surfaces of the leg portions adjoining the arcuate portion. The U-bolt can be galvanized in this condition, where necessary, and thereafter, with the keeper assembled in place, the legs are drawn to a parallel condition wherein the keeper is retained by the projections in conjunction with the arcuate portion of the U-bolt, while the U-bolt has not been the subject to sufficient deformation to damage the coating thereon.

It is an object of this invention to provide a simplified assembly of a captive U-bolt and keeper element that minimizes scrap losses during fabrication.

It is also an object of this invention to provide such an assembly that does not require refinishing of parts subsequent to assembly.

Other advantages will become apparent to those skilled in the art when the following description is taken in connection with the accompanying drawings, wherein:

FIG. 1 is a side elevation of a clamp utilizing the captive U-bolt assembly of this invention with various concealed portions shown in phantom view;

FIG. 2 is a partial section taken along line 2—2 of FIG. 1;

FIG. 3 is a view of the U-bolt just prior to final assembly to the keeper (shown in section); and FIG. 4 is a section view taken along line 4—4 of FIG. 3.

Referring to FIG. 1, the cable end 11 is shown retained in a deadend strain clamp 13 utilizing the keeper and captive U-bolt assembly of this invention. The U-bolts 15 and 16 are restrained from axial movement with respect to the keeper 17 by the keeper raised portions 18. The U-bolts 15, 16 are restrained or retained on the keeper by the U-bolt projections 20 that underlie the keeper as shown in FIG. 2.

The U-bolt keeper assembly may be readily secured as a unit to the clamp body 22 in surrounding relation to the cable end 11 to complete the clamping assembly upon tightening the standard hex nuts 24.

The U-bolt 15 is fabricated by forming the rod to the approximately U-shape shown in FIG. 3 wherein the legs 25 are slightly divergent. The bolt 15 is then placed in a die and the projections or ears 20 are formed on the inwardly facing surface portions of the legs 25 just below the curved portion of the rod. The U-bolt leg 25 with the projection 20 formed thereon is shown in section in FIG. 4. Following this operation the galvanizing or other protective coating is applied.

It will be noted in FIG. 3 that the legs are sufficiently divergent to allow the projections to pass over the saddle portion of the keeper 17 which is intermediate the raised portions 18. With the U-bolt so positioned with respect to the keeper the legs 25 are drawn toward one another, attaining the parallel condition shown, in FIG. 3 wherein the projections 20 at least partially underlie the keeper. The slight amount of deformation necessary to bring the U-bolt legs 25 to a parallel condition does not destroy or impair the effectiveness of the protective galvanazing or other commonly used protective coating.

Although but one embodiment has been shown and described, it will be apparent to those skilled in the art that various changes and modifications may be made therein without departing from the spirit of the invention or from the scope of the appended claims.

I claim:

1. The method of fabricating a U-bolt keeper assembly comprising: forming a rod into a U-bolt having diverging legs; forming ears on each of said U-bolt legs on the surface adjoining the interior curvature of said rod; placing the keeper between said U-bolt legs in proximity to the inner curved surface of said rod and drawing the U-bolt legs toward one another to a substantially parallel relationship whereby said ears are in at least partially underlying relation to said keeper.

2. The method of fabricating a U-bolt keeper assembly comprising: forming a rod into a coplanar configuration having a pair of diverging legs extending from a curved portion; forming ears from the material of said rod on each of said legs adjoining the interior curvature of said curved portion; placing the U-bolt engaging portion of a keeper plate adjacent said interior curvature of said curved portion and drawing said legs toward one another to a substantially parallel disposition whereby said ears prevent disassembly of said U-bolt and keeper plate.

3. The method of fabricating a U-bolt keeper assembly comprising: forming a rod into a coplanar configuration with a pair of diverging legs extending from a curved portion; forming an ear on each of said legs on the confronting surfaces thereof adjoining the curved portion; thereafter applying a protective coating to the surface of said U-bolt; assembling the keeper plate adjacent the interior curved surface of said curved portion and drawing said legs toward one another to a substantially parallel disposition wherein said ears at least partially underlie said keeper preventing disassembly of said U-bolt and keeper plate.

References Cited

UNITED STATES PATENTS

| 1,340,730 | 5/1920 | Moore | 24—135 |
| 1,584,848 | 5/1926 | Clowes | 24—135 |
| 1,905,567 | 4/1933 | Milne. | |

FOREIGN PATENTS

| 555,612 | 7/1923 | France. |
| 754,166 | 11/1933 | France. |
| 371,068 | 5/1939 | Italy. |

CHARLIE T. MOON, Primary Examiner.